(12) United States Patent
Gonzalez et al.

(10) Patent No.: US 7,225,220 B2
(45) Date of Patent: May 29, 2007

(54) ON-LINE SELECTION OF SERVICE PROVIDERS IN DISTRIBUTED PROVISION OF SERVICES ON DEMAND

(75) Inventors: Manuel Gonzalez, Barcelona (ES); Alex Roche, Barcelona (ES)

(73) Assignee: Hewlett-Packard Development Company, LP, Houston, TX (US)

( * ) Notice: Subject to any disclaimer, the term of this patent is extended or adjusted under 35 U.S.C. 154(b) by 792 days.

(21) Appl. No.: 09/907,583

(22) Filed: Jul. 19, 2001

(65) Prior Publication Data

US 2002/0019786 A1 Feb. 14, 2002

(30) Foreign Application Priority Data

Jul. 21, 2000 (GB) ................................. 0017918.4
Aug. 11, 2000 (GB) ................................. 0019675.8

(51) Int. Cl.
*G06F 15/16* (2006.01)

(52) U.S. Cl. ...................... 709/202; 709/203; 709/217; 709/223; 709/238; 705/8; 705/26; 358/1.15

(58) Field of Classification Search .................... 705/8, 705/26, 400; 709/202–203, 206, 217–219, 709/223–224, 238–242; 358/1.15
See application file for complete search history.

(56) References Cited

U.S. PATENT DOCUMENTS

| | | | | |
|---|---|---|---|---|
| 4,839,829 A | * | 6/1989 | Freedman | ................... 715/751 |
| 5,826,244 A | * | 10/1998 | Huberman | ................... 705/37 |
| 6,026,375 A | * | 2/2000 | Hall et al. | ...................... 705/26 |
| 6,047,274 A | * | 4/2000 | Johnson et al. | ............. 705/412 |
| 6,049,774 A | * | 4/2000 | Roy | .............................. 705/8 |
| 6,061,691 A | * | 5/2000 | Fox | ......................... 707/104.1 |
| 6,070,142 A | * | 5/2000 | McDonough et al. | .......... 705/7 |
| 6,131,087 A | * | 10/2000 | Luke et al. | .................... 705/26 |
| 6,389,400 B1 | * | 5/2002 | Bushey et al. | ................. 705/7 |

(Continued)

FOREIGN PATENT DOCUMENTS

EP 0588513 A2 3/1994

(Continued)

*Primary Examiner*—Saleh Najjar
*Assistant Examiner*—Shawki Ismail
(74) *Attorney, Agent, or Firm*—Lee & Hayes, PLLC

(57) ABSTRACT

An electronic control apparatus configured for use in routing customer orders, received over the internet, to a service provider such as a print service provider selected from a plurality of competing print service providers, comprises an electronic interface configured to receive and acknowledge customer orders; first processing means configured to compare the requirements of a received order with pre-stored information specific to each of the competing service providers; responsive means configured to establish a list of the service providers determined to be able to fulfill requirements of the received order; and processing means configurable, for a received order, to make the selection from the list and to route the received order to the selected service provider. Advantageously by applying a series of filters an optimum service provider is selected by a gateway device assigning a printing order to a print service provider taking into account geographical criteria, and attempts to minimize the final price, in particular the shipping costs. While minimizing costs to the end customer, the gateway device seeks to ensure that a print service provider having competitive prices still receives work.

32 Claims, 12 Drawing Sheets

U.S. PATENT DOCUMENTS

| | | | |
|---|---|---|---|
| 6,397,197 B1 * | 5/2002 | Gindlesperger | 705/37 |
| 6,509,974 B1 * | 1/2003 | Hansen | 358/1.12 |
| 6,529,286 B1 * | 3/2003 | King | 358/1.14 |
| 6,598,029 B1 * | 7/2003 | Johnson et al. | 705/37 |
| 6,650,433 B1 * | 11/2003 | Keane et al. | 358/1.15 |
| 6,687,018 B1 * | 2/2004 | Leong et al. | 358/1.15 |
| 6,798,876 B1 * | 9/2004 | Bala | 379/265.12 |
| 2003/0187710 A1 * | 10/2003 | Baumer et al. | 705/8 |

FOREIGN PATENT DOCUMENTS

| | | | |
|---|---|---|---|
| EP | 1103909 A2 | 5/2001 | |
| GB | 2271654 A | 4/1994 | |
| WO | WO97/32274 A2 | 9/1997 | |
| WO | WO 00/33223 * | 6/2000 | 180/206 |

* cited by examiner

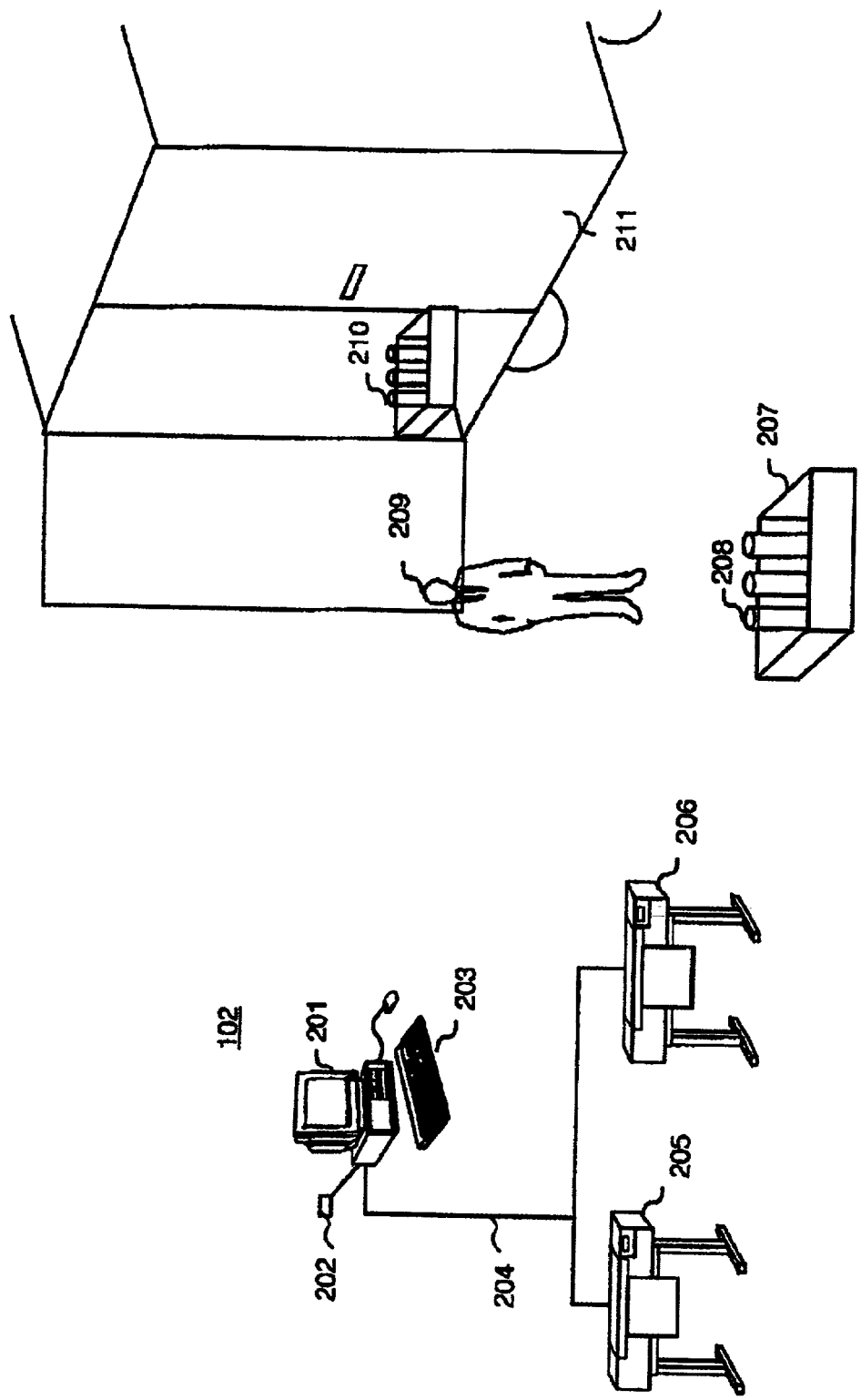

| Service Provider (PSP) | Capacity | Current Load | % Free Capacity |
|---|---|---|---|
| #1 | 100 | 20 | 80 |
| #2 | 200 | 20 | 90 |
| #3 | 50 | 10 | 80 |

Fig. 9

ON-LINE SELECTION OF SERVICE PROVIDERS IN DISTRIBUTED PROVISION OF SERVICES ON DEMAND

RELATED APPLICATION

The following commonly assigned application, filed on Nov. 9, 2000, may contain some common disclosure and may relate to the present invention. Thus, the following application is hereby incorporated by reference:

U.S. patent application Ser. No. 09/447,910, entitled "ENTERPRISE JOB MANAGEMENT SYSTEM."

FIELD OF THE INVENTION

The present invention relates to on-line selection of service providers over an electronic network, and particularly, although not exclusively, to on-line allocation of customer print orders to selected print service providers.

BACKGROUND TO THE INVENTION

With the advent of the internet and the World Wide Web (WWW) there is an increase in the accessibility to and provision of, on-line services. In the field of printing services, for example, there exists entities offering printing services, for example the known www.mediaflex.com. A print service provider (PSP) may offer a range of printing services. A customer requiring a print service is likely to be faced with the task of finding a suitable print service provider who can provide the required printing services at an affordable cost in reasonable time.

Prior art approaches are known in which a customer may place an order over an internet connection to an appropriately configured interactive website owned by a print service provider and whereafter the print service provider utilizes human resources to complete a given order request. Human interaction in this way may lead to delays in that a customer order may be held up in view of a print service provider being saturated with orders. A human operator may be required to make complex decisions based on availability of a given print service provider, timing requirements of a given customer, costs associated with the particular printing job received, whether or not the print service provider can in fact produce the required goods and so on. The problem is compounded further in that a print service provider entity may become under utilized or over-utilized which may present problems to the smooth provision of printing services.

There is a need for an improved method and associated apparatus for allocating print service orders to service providers over an electronic network. In particular, there is a need for providing reasonably fast responses to customer orders made over an electronic network such that such orders are dealt with in as near to real time as possible. There is a need for increasing the speed of transactions so that the capacities of service providers are utilized as efficiently as possible whilst maintaining reasonable costs over a prolonged period of time. On a wider scale there is a need for an improved customer ordering scenario over an electronic network wherein a given customer's requirements are satisfied as soon as possible and managed over time such that a wider variety of specialized and non-specialized services exist with associated costs of such services remaining fairly constant.

Services such as print on demand services via the internet generally fall into two groups as follows:

Open print on demand services. In this group, PSP's compete for the assignment of an order. The PSP who makes the best bid will serve the printing order. This system tends to benefit customers rather than PSP's. PSP's with expensive bids will tend to be subject to receiving less and less jobs although the price difference, as compared with other PSP's, may not be too large.

Closed print on demand services. In this group, the Print on Demand service tries to distribute equally the printing orders amongst all the PSP's. It tends to benefit PSP's rather than customers because it assigns orders to PSP's not taking into account final price.

It is known that existing prior art service provision demand services working in the internet arena generally form into one of the above identified two categories. This, therefore invariably leads to the problem of a given customer or a given PSP being favoured against another. Moreover, some of the solutions do not implement the concept of a distributed printing warehouse comprising a plurality of print service providers distributed over a given geographical region. Existing print on demand services may also be limited in that they may be concentrated in a centralised print centre which as described above leads to a penalty of increased shipping costs for customer orders placed by customers who are located geographically substantially distant from the print centre. For example, if a print centre is based in the United Kingdom then Spanish end customers will be subject to pay international delivery fares as compared with UK based customers.

Prior art known to the inventors of the present invention is that described in U.S. Pat. No. 5,995,721 published on Nov. 30, 1999. This prior art distributed printing system described in U.S. Pat. No. 5,995,721 offers, an improved automated procedure for providing printing services to given customer orders, but is complex in that it is required to sub-divide a given customer order (or job) into a plurality of job portions which may be delivered to one or more queues. This approach has various problems including an increase in the likelihood of orders being mixed up in view of job apportionment to different printing units within a given print centre.

As an overall improvement to current print on demand services there is a need for increased automation of allocation of print orders to print service providers.

For the reasons discussed above there is a need to bring together the best of the two types of known on-line print service provision. In other words, there is the need to minimize customer cost whilst ensuring that a PSP with competitive prices does not find itself in a position with no orders. In addition, there is a need to distribute orders for printing services on a more global level. Local print service providers do not always provide a best cost to local customers, even when taking into account shipping costs. Thus, geographical criteria are required to be taken into account in terms of minimizing final price of a given order.

SUMMARY OF THE INVENTION

In a specific implementation of the present invention, print service providers are selected on the basis of a trade off between the price to the final customer, and the workload of a plurality of print service providers. Customer orders are allocated to print service providers selected with a 'reasonable' final price, rather than to a print service provider offering the lowest cost service. Final customers for print items may be provided with a cheapest and fastest delivery, whilst print service providers are offered print jobs according to their unutilized printing capacity, provided that their prices are within reasonable preset limits.

According to the first aspect of the present invention there is provided an electronic control apparatus configured for use in routing customer orders received over an electronic network to a service provider selectable from a plurality of service providers, said apparatus characterized by comprising:

an electronic interface configured to receive and acknowledge said customer orders;

first processing means configured to compare the requirements of a said received customer order with pre-stored information specific to each of said plurality of service providers;

a memory configured to store a list of said service providers determined to be able to fulfil the requirements of a said received order; and further processing means configurable, for a received order, to make a said selection of at least one service provider from said list, and to route said received order to said selected service provider.

According to the second aspect of the present invention there is provided a method of automatically selecting a service provider from a plurality of service providers operating to complete customer orders received said method comprising the steps of:

comparing the requirements of a received order with pre-stored information specific to each of said service providers and in response to said comparison establishing a list of said service providers able to fulfil the requirements of said received order; and making selection of at least one said service provider from said list; and routing said received order to said selected service provider.

According to the third aspect of the present invention there is provided a method of allocation of online print services, supplied by a plurality of print service provider entities said method comprising the steps of:

storing data describing a plurality of print service provider entities;

automatically selecting at least one print service provider for fulfillment of an order received online; and sending said order to said print service provider for fulfillment by said selected print service provider.

Other aspects of the invention and further features according to the invention are as described in the claims appended hereto.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 2 schematically illustrates premises from which a print service provider operates and includes printing equipment 205, 206 and shipping facilities such as a road delivery vehicle 211;

FIG. 9 details a table of data for capacity, current load and percentage free capacity for a plurality of service providers remaining in a partially filtered list resulting at step 707 in FIG. 7;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

According to the best mode implementation of the present invention, a print on demand service offered via the internet attempts to connect printing demand with printing capabilities using internet technology. Broadly, a printing work flow starts when a customer, present over the internet, orders a printing service. A printing order is validated by a gateway server, which assigns the print request to a printing entity communicating with the gateway device. A print service provider (PSP) is selected by the gateway entity on the basis of a current utilization of the PSP and a price quoted or offered by the PSP.

The gateway device attempts to balance the interests of customers in achieving low price, and prompt delivery, with the interests of print service providers to achieve efficient capacity utilization so that customer's print orders can be satisfied by a print service provider selected by the gateway device on terms which are mutely acceptable. The gateway device assigns a print order to a print service provider taking into account geographical criteria, and attempts to minimize the final price, comprising both the printing cost and the shipping cost. Whilst minimizing costs to the end customer, the gateway device seeks to ensure that a print service provider having competitive, but not the lowest prices still receives work.

Figure 1:
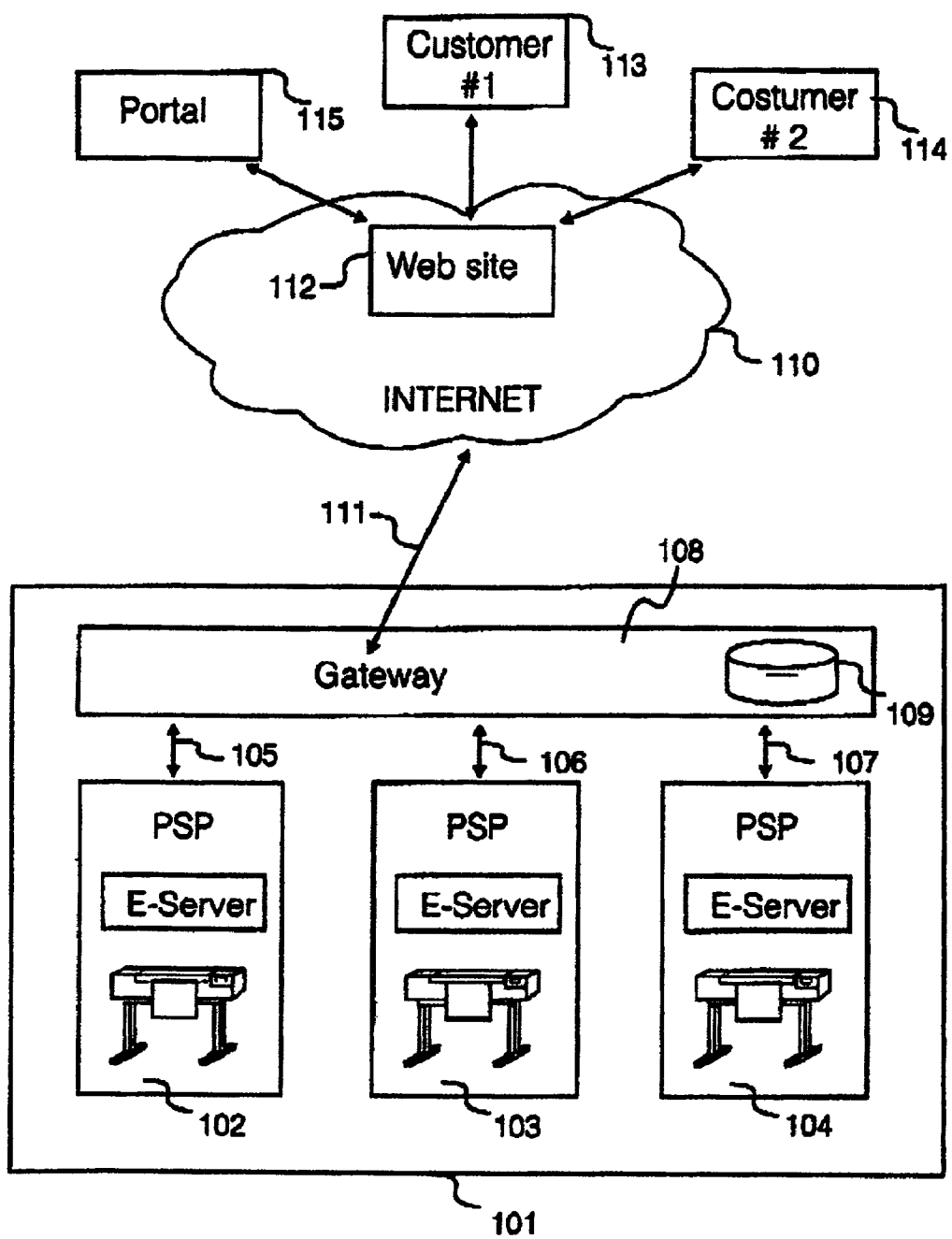
FIG. 1 schematically illustrates apparatus as configured in accordance with the present invention for effecting on line selection of, by way of example, print service providers, the apparatus comprising a gateway device (108) configured to enable intelligent selection of a suitable print service provider for a given customer's printing requirements.

FIG. 1 schematically illustrates apparatus as configured in accordance with the methods and procedures developed as part of the present invention. Selection of a print service provider is made automatically from a collection of print service providers competing with each-other for printing work. The specific implementation described operates over the internet and World Wide Web—however, the apparatus and methods are to be understood as readily applicable to a wide variety of other networks. The specific implementation is advantageous over prior art solutions in that it implements a smart trade off between customer final price and print service provider (PSP) workload. Moreover, it offers to customers the cheapest and fastest delivery type taking advantage of the concept of a printing warehouse, that is a distributed collection of print service providers distributed throughout the world (or other geographic region) and operating through a print service host gateway entity. When a customer order arrives to the printing service gateway the PSP selected is that with a "reasonable" competitive, final price and not always the cheapest one.

The apparatus as configured in accordance with the present invention comprises a printing warehouse 101 comprising a collection of print service providers 102-104 each comprising a print manager computer (hereinafter called an E-server) and associated on-line printing equipment. Each print service provider 102-104 may provide differing printing services with some specialization in certain areas of printing work through their having certain specialized printing equipment. Each print service provider 102-104 communicates with an electronic network gateway device 108 operated by a print merchant via internet communication links 105, 106 and 107 respectively. Gateway device 108 comprises a database of stored information 109 which is further detailed below. Gateway device 108 is able to receive orders from customers made over the internet or other electronic network 110 via communications link 111. Thus, gateway device 108 represents an electronic control apparatus configured for use in routing customer orders received over an electronic network to a service provider selected from the plurality of service providers 102-104. A given customer may access gateway device 108 by way of an interactive website 112 configured by the print service host (gateway) 108. Thus, for example a customer #1, 113 may access services provided by a given one of a set of print service provider 102-104 via establishing a communication link with website 112. Similarly, another customer such as customer #2, 114 may also communicate with website 112 via establishment of an appropriate internet based communication link. In addition to direct customer access a given portal 115 may also establish communication with website 112 and gain access to print service provider services via communications link 111 and gateway device 108. Website 112 thus represents an electronic interface configured to receive and acknowledge customer orders placed over the internet and transmitted to gateway device 108.

Figure 1A:
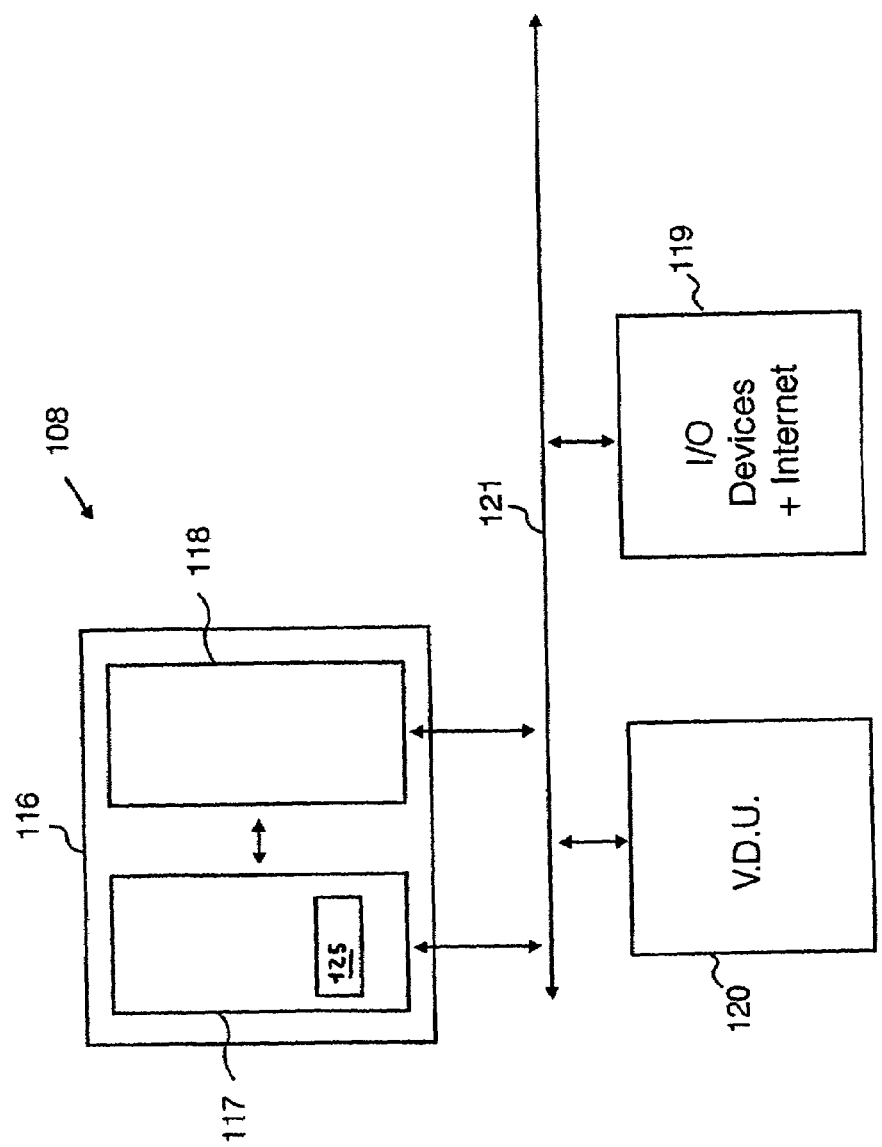
FIG. 1A further details the gateway device 108 identified in FIG. 1 and includes a first processing means (117) and a second processing means (118) in addition to the usual hardware typically used with personal computers and servers.

FIG. 1A further details the gateway device identified in FIG. 1. Gateway device 108 comprises a first processing means 117 to effect a first processing regime upon each given service provider under consideration for allocation of a given job and a second processing means 118 for invoking a second processing regime upon a given selected service provider under consideration for allocation of a given customer order. Processing means 117 and 118 are comprised within a central processing unit 116. The results of such first processing regime may typically be temporarily stored into a memory 125 preferably available in the first processing means, but such results can be equally stored in a memory available in the central processing unit 116 or in the second processing means 118 or in a storage unit available in the gateway 108. A central processing unit 116 may typically be able to communicate with a variety of input/output devices and network connections (eg. the internet) via input/output devices 119. Similarly, central processing units 116 will be able to display information on a visual display unit 120, communication between central processing unit 116 and devices 119 and 120 may be by a bus 121 or some other data transport mechanism. Processing means 117 and 118 may be in the form of hardwired electronic circuits or independent computer programs written in a known computer language such as JAVA.

FIG. 2 further details premises associated with a print service provider 102 identified in FIG. 1. Print service provider 102 may utilize a variety of internet based communications apparatus such as PSP server computer 201 configured to communicate with the internet via modem link 202. PSP Computer 201 is configured for use by a human operator so as to check for orders received from gateway device 108 and may typically comprise the usual office software, hardware, input devices such as keyboard 203, memory and data storage devices. PSP computer 201 is linked to a variety of printing devices on the premises of the print service provider via data communications link 204 which is electronically connected to various print machines such as printing machine 205 and printing machine 206. Upon receiving a given printing order from the print service gateway host 108 the various printing jobs are printed off on the printing equipment 205, 206 and thereafter the printing jobs are packaged as appropriate. Thus, for example a collection of processed printing jobs are schematically illustrated in packaging box 207 and include packaged printing jobs placed in tubes such as tube 208. Following packaging a given human operator 209 may load the completed printed jobs into a suitably configured delivery vehicle 211 as shown at 210. The print service provider 102 may be located substantially anywhere in the world, the only significant requirement being that the print service provider is required to communicate with gateway device 108 via an internet based connection so that given orders can be received and acknowledged.

Figure 3:
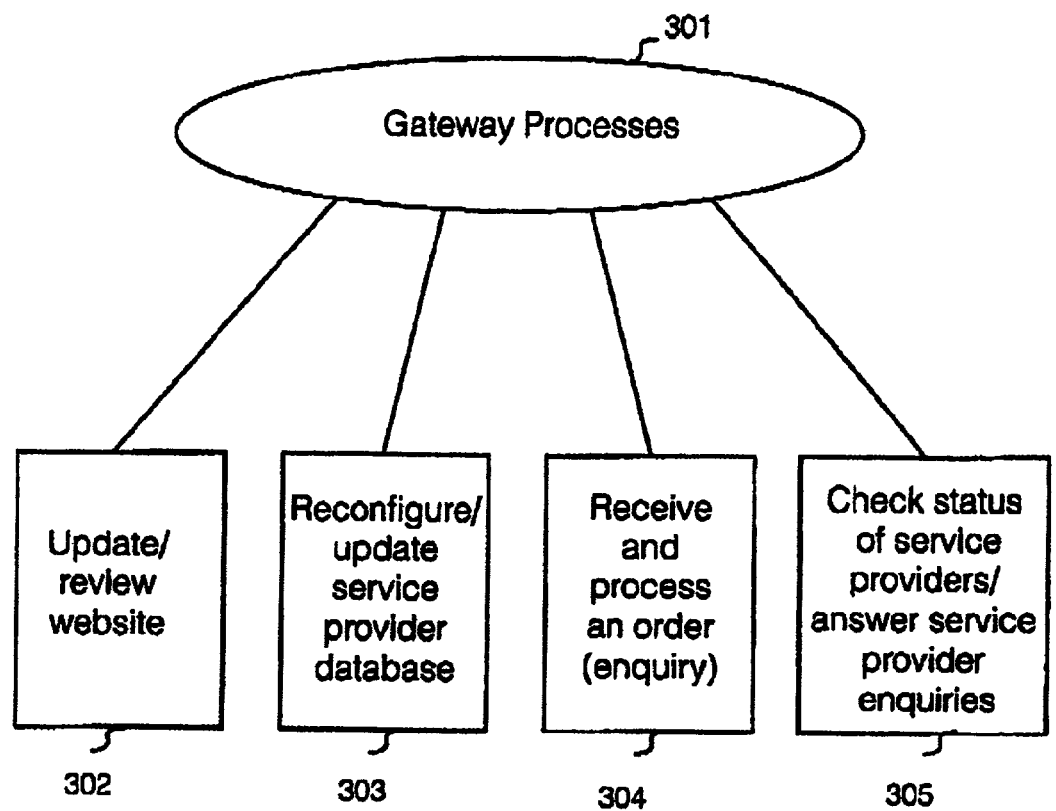
FIG. 3 schematically illustrates processes comprised within the gateway device 108 identified in FIG. 1 and in particular includes a process 304 configured to receive and process a given customer order/enquiry.

FIG. 3 schematically illustrates a variety of processes effected by gateway device 108. The various gateway processes 301 include process 302 of reconfiguring and updating details of given portals stored in a database of gateway device database 109. A further process 303 relates to reconfiguring and updating details of given service providers stored in a database of gateway device database 109. Process 304 relates to algorithms invoked in response to gateway device 108 receiving a customer order or an enquiry from a customer as to how much a given printing job will cost preferably in terms of printing costs and shipping costs. Process 305 relates to checking the status of a given service provider so that gateway device 108 is intermittently updated with respect to whether or not a given service provider is available to take on further work, whether or not the service provider has increased or reduced service provision recently, etc. The types of data stored in internet gateway device 108 are held in database 109 as illustrated in FIG. 1.

Figure 4:
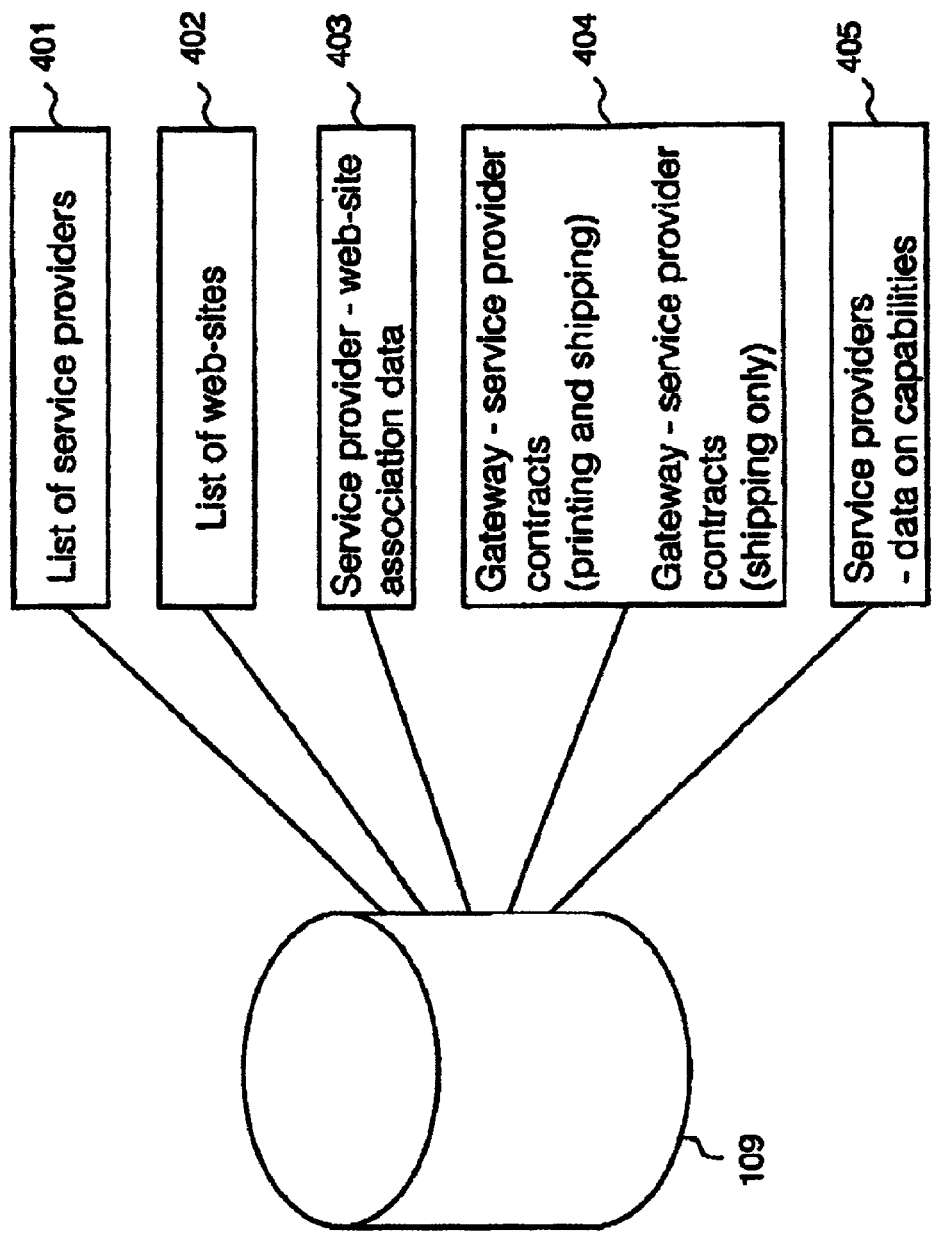
FIG. 4 schematically illustrates data types stored by gateway device 108 and in particular includes a list of service providers 401 and information 405 on the capabilities of each service provider held in list 401.

FIG. 4 further details the types of information stored in gateway database 109 and includes a list of service providers 401 with whom the gateway device printing entity has established a legally binding contract with in terms of supplying customer orders. Database 109 also comprises a list of websites 402 associated with each print service provider, these providing further information to customers on request and also enabling gateway device 108 to communicate directly with a website of a given service provider. To this end database 109 also stores information on service provider—website associations so that a given website can be identified as belonging to a given service provider automatically. Service provider—portal association data 403 can be updated from time to time, for example if some service providers are added to the gateway. The gateway device entity 108 can thus be seen to act as a central point wherein customer printing orders are received and thereafter passed onto a given service provider. For the commercial exploitation of gateway device 108 a service provider contract is required so that any orders received can be profited from by both the service provider allocated the given job and the business entity having ownership over gateway device 108. Various types of service provider contracts may exist including those based on costs associated with printing and shipping and those based on shipping costs only. The various contracts are schematically illustrated at 404. Perhaps the most important data held in database 109, besides the list of service providers 401, is, in accordance with the present invention, data associated with the capabilities of each given service provider, 405. Gateway device 108 is, in accordance with the present invention, configured to select a given service provider depending upon a variety of factors including the capabilities of the given service provider and geographical location in addition to shipping costs.

Figure 5:
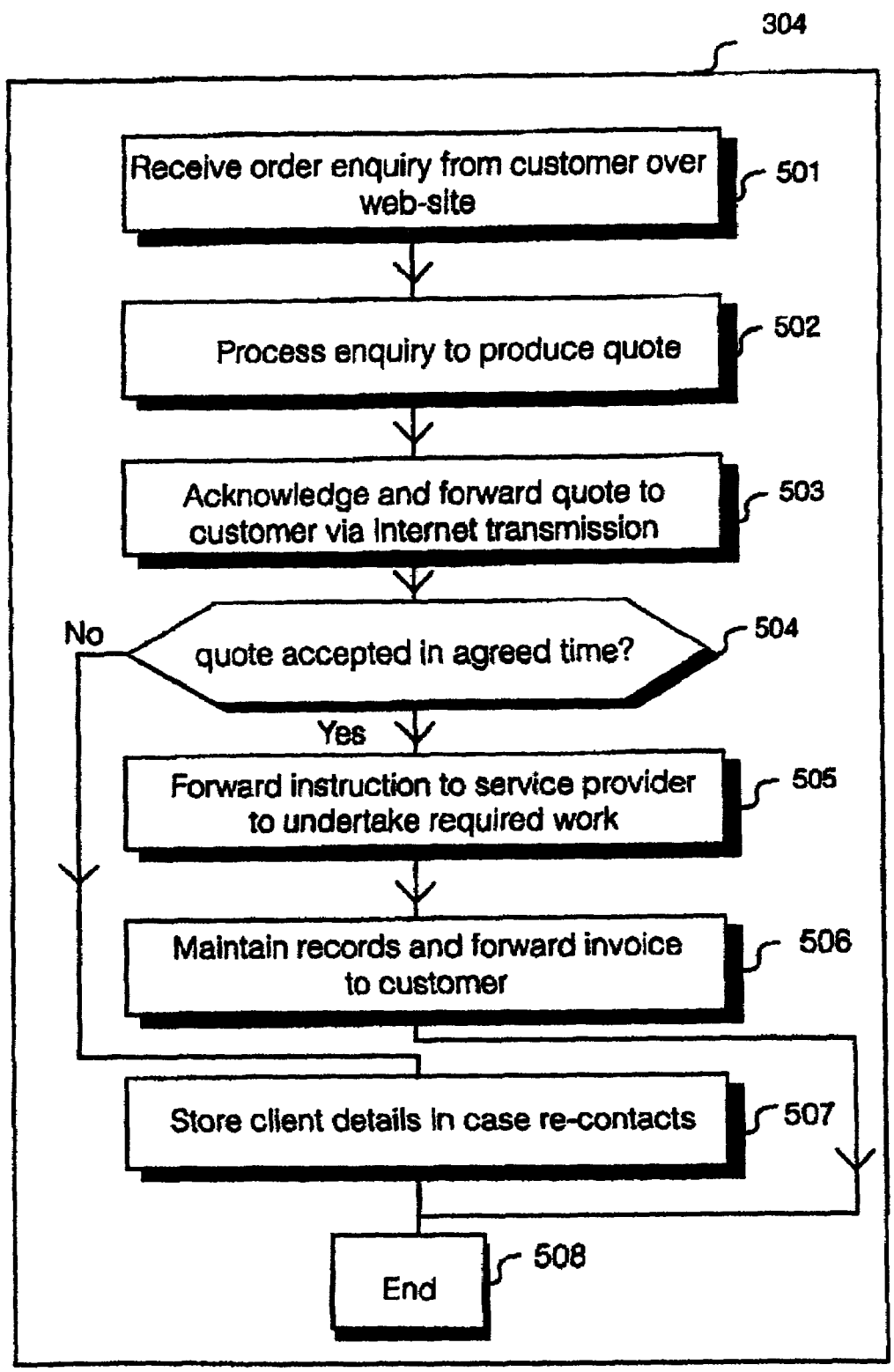
FIG. 5 further details gateway process 304 as may occur for a single order/enquiry being initiated by a given customer and in particular includes a step 502 configured to process the enquiry/order so as to produce a quote for return to the potential customer.

FIG. 5 schematically illustrates an overview of the main steps involved in receiving an order from a given customer 113 or portal, 115 to instructing a given service provider to undertake printing work required by a given customer. Typically, a customer requiring printing services may wish to have a certain poster or other aesthetic creation printed in a particular way or on a particular medium or with a particular finish or in a particular size, etc. FIG. 5 thus represents in more detail the process identified at 304 in FIG. 3. Process 304 starts at step 501 wherein a given order placed by an internet based customer 113 has placed an order or an order enquiry over the internet 110. Following step 501 control is passed to process 502 which concerns processing the enquiry so as to produce a quote to the customer. Following step 502 gateway device 108 may be suitably configured to acknowledge and forward the calculated quote to the customer via an internet transmission through communications link 111 to the internet 110. Following step 503, control is passed to step 504 wherein gateway device 108 is suitably configured to wait for a pre-determined time (possibly a few days or weeks) so as to receive a reply as to whether or not the provided quote is actually accepted. Acceptance of the provided quote may be substantially immediate or it may take a given customer a certain period of time depending on the customers particular circumstances. Thus, step 504 represents a question as to whether the quote has been accepted in an agreed or pre-determined amount of time. If the quote provided at step 503 is accepted in a pre-determined amount of time then control is passed to step 505 and gateway device 108 is thereafter configured to forward appropriate instructions to a given service provider to undertake the required work. At step 505 details of the given printing job in the form of data files will also be forwarded to the service provider so that the service provider has all the required information required to complete the printing job instructed. Following step 505 control is passed to step 506 wherein gateway device 108 is configured to maintain records and forward an invoice to the customer and following step 506 control is passed to step 508 wherein process 304 is effectively terminated. However, if the question asked at step 504 is answered in the negative then a suitably configured gateway device 108 may be configured to pass control to a step such as step 507 wherein the customer details may be stored for a time in case the customer re-contacts. Following step 507, if no further contact occurs, then control is passed to step 508 and the process is terminated. Should a customer with details stored in step 507 re-contact then effectively process 304 may be re-started.

Figure 6:
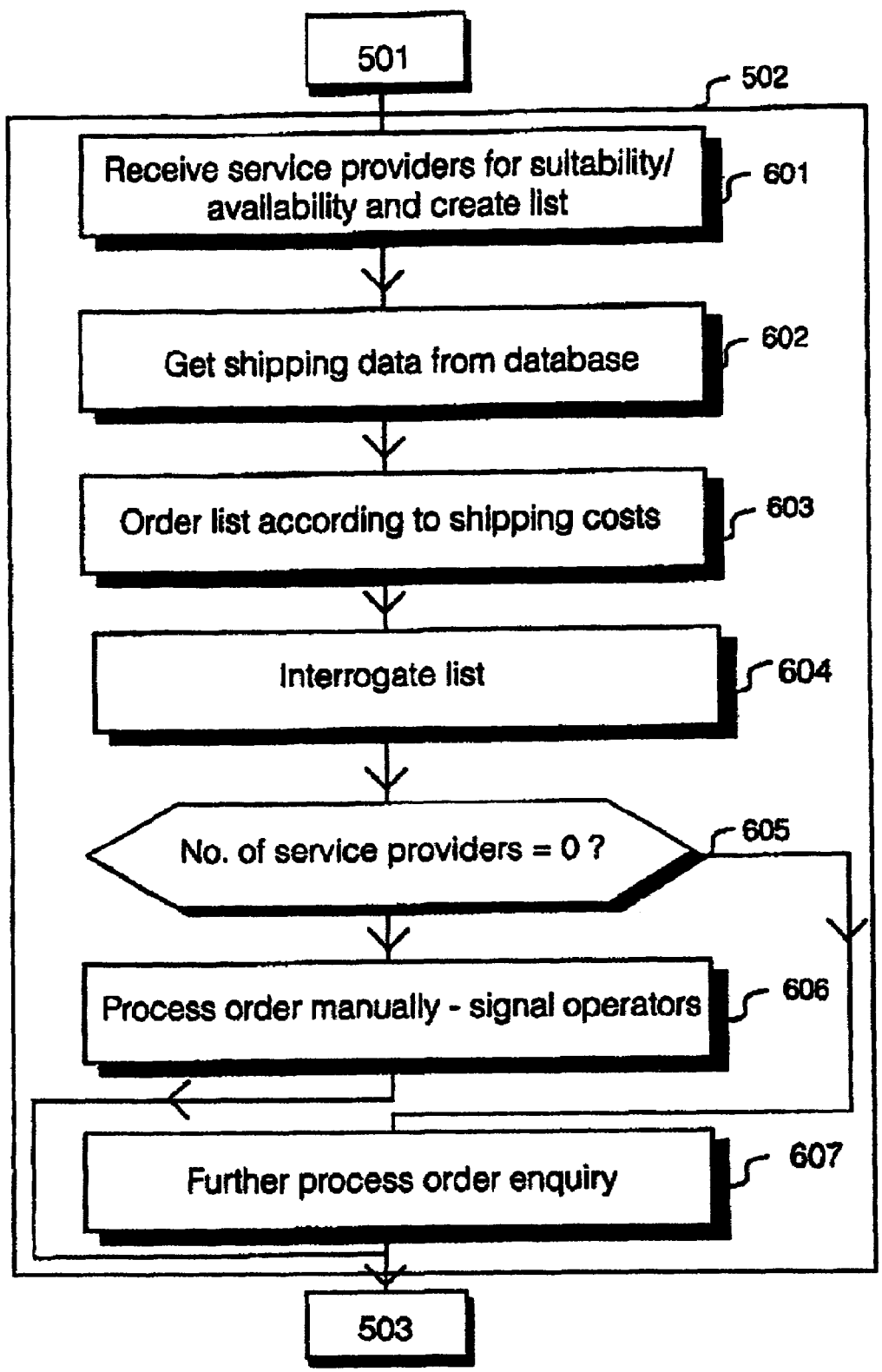
FIG. 6 further details step 502 identified in FIG. 5 and in particular includes a step 603 wherein a list of appropriate service providers (eg. print service providers) is ordered according to shipping costs associated with a given print service provider's conditions of business for a particular job and also includes a step 607 wherein further processing of an order enquiry is invoked if one or more service providers have been identified as suitable.

Step 502 relating to processing of a customer order or customer enquiry is further detailed in FIG. 6. Selection of a print service provider to fulfil an order is made in step 502. At step 601 gateway printing host device 108 is configured to review the service providers with which it has contracts with, as to their suitability and availability with respect to undertaking a given printing job requested by a given customer. Suitable service providers are selected and placed in a list stored electronically by gateway device 108, the list representing all suitable/available print service providers. Any print service providers which are either not available at the time or which are deemed not able to deliver the required end printed product(s) (eg. those which did not support a given printing format, size of paper, media or ink type etc) or which are geographically too remote from the delivery address to be able to deliver the goods within the time specified in the order, due to shipping delay, or which incur a high customs levy are at this stage discarded. To determine whether a print service provider is currently active or unavailable, etc, those skilled in the art will readily appreciate that a variety of techniques could be used such as setting a flag tag to an "on" position if the print service provider is currently on line, etc. In the preferred embodiment of the present invention a given print service provider is required to send status signals back to the gateway device 108. Following step 601 gateway device processing control is passed to step 602 wherein final price data associated with each print service provider is retrieved from database 109 (or in an alternative embodiment from the service provider itself). The final price for a print order quoted by a print service provider may include a printing price charged by the print service provider, and a shipping price charged by a shipping company for delivery of the print products specified in a print order to an address specified in a print order. The shipping price may be quoted direct to the gateway device by a shipping company or may be quoted to a print service provider, who then re-quotes the shipping price to the e-gateway device, possibly adding a mark up to a price quoted to the print service provider by the shipping company. Following downloading of the required final price data (from database 109) control is passed to step 603 wherein the list of suitable/available print service providers is ordered according to price. By ordering it is meant that the print service providers are arranged in an order representing higher prices to lower prices or vice versa. Following step 603 control is passed to step 604 wherein gateway device 108 is configured to interrogate the list as now arranged in terms of ascending prices. The interrogation step 604 may comprise a consideration of geographical location of a given print service provider (through, for example, the shipping cost information) etc so as to further optimize (intelligently) a competitive or reasonable end price for the particular customer who has placed the order. Having the print service provider located in the vicinity of the delivery address specified in the order may lead to a lower delivery time than for a print service provider located far from the delivery address. Additionally, if the products are printed in a country different from the country of the delivery address, then customs authorities may add a charge to the cost of the goods imported. Thus, gateway device 108 comprises first processing means configured to compare the requirements of a given received order with pre-stored information specific to each of the competing service providers. At this stage, gateway device 108 will thus have a list of service provider entities which have been determined to be able to fulfill the requirements of a given received customer order, this list being created in response to processing means configured to establish such a list based on the customer requirements. Following step 604 a question is asked at step 605 as to whether the number of service providers in the created list is zero. If 509 then control is passed to step 606 wherein a signal is generated to an operator of gateway device 108 so as to alert the human operator to the fact that the order must be processed manually. Should a zero result of this kind occur then control is passed from step 606 to step 503 in FIG. 5 wherein certain parts of steps 503-508 may be required to be actioned manually and others may still be automated.

Returning back to step 605, if the question asked at step 605 is answered in the negative then the number of service providers able to process the given customer order is not zero and control is passed to step 607. Gateway device 108 thus comprises further processing means configurable, for a received customer order, to make a specific selection of a given single print service provider from the list created at 601 and furthermore gateway device 108 is configured to thereafter route the received order to the selected service provider. The way that the service provider makes such a final selection is further detailed in FIG. 7 which further details the processes occurring in step 607 of FIG. 6 Referring to FIG. 1A processing steps 501-605/606 are executed by a first processing means (117) in central processing unit (116). In contrast, prior art open systems select service providers which have the lowest price for the end user.

Figure 7:
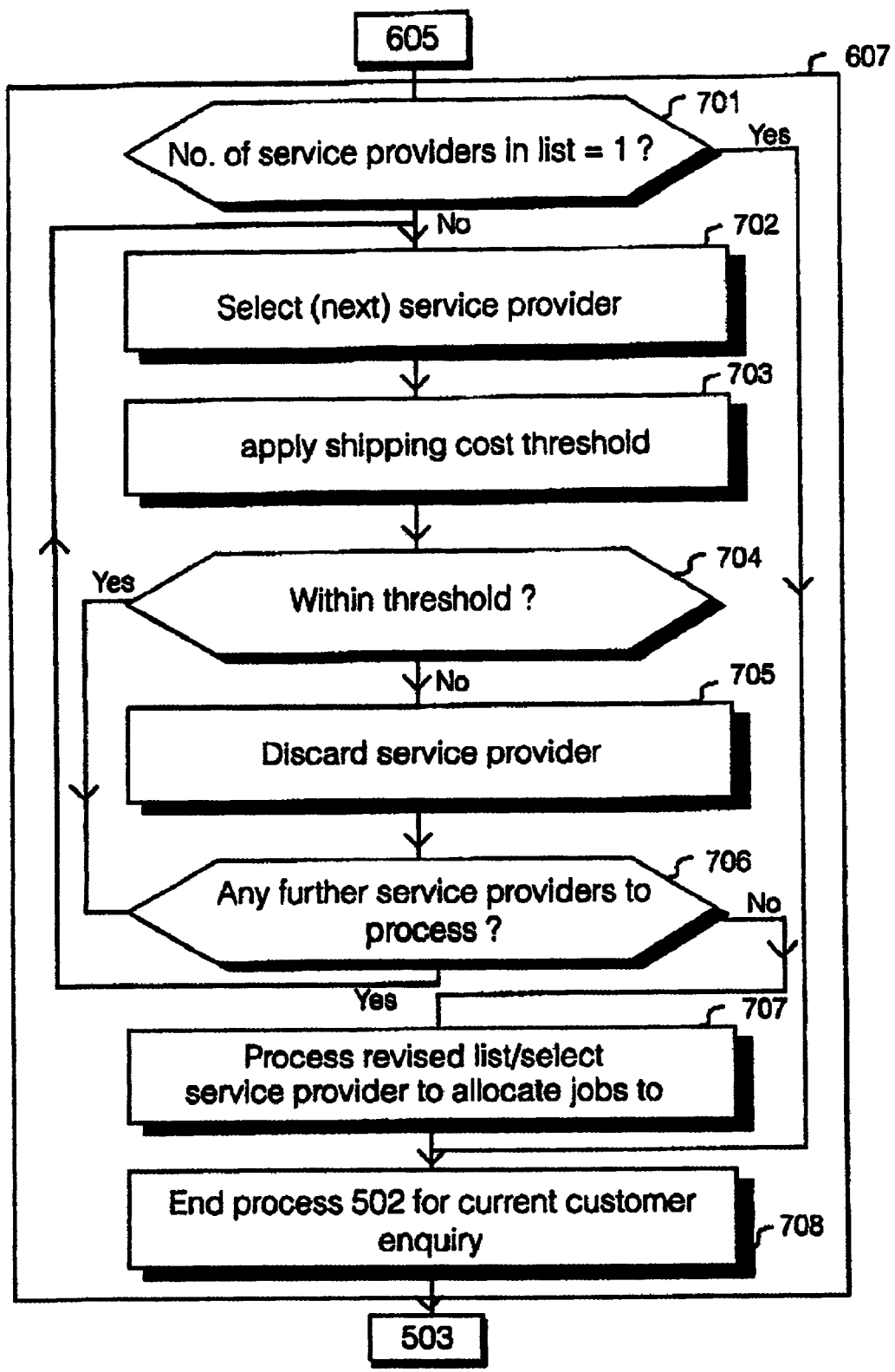
FIG. 7 further details step 607 identified in FIG. 6 and includes a step 704 wherein a list created in step 601 is further reduced by comparing the service provider's quoted shipping cost with a pre-determined threshold value and step 607 also includes a step 707 in relation to making a final selection of a single service provider from the resulting finalized list.

Step 607 is further detailed in FIG. 7 and comprising processing performed by further processing means 118 identified in FIG. 1A. At step 701 gateway device 108 is configured to ask a question as to whether or not the number of service providers remaining in the list is equal to unity. If the answer to this question is in the affirmative then control is passed to step 708 wherein process 502 for the current customer order/enquiry is effectively terminated with control thereafter passing to step 503 and the order being processed directly with the single service provider identified. In other words in this case further processing is automatically effected and the print job requested by the given customer is automatically directed to the print service provider identified as the only service provider able to undertake the required printing task(s).

Alternatively, if the question asked at step 701 is answered in the negative then control is passed to step 702 wherein the first print service provider in the list is effectively selected for further processing. Following step 702 gateway device 108 is, in accordance with the present invention, configured to apply a final threshold price for comparison with the print service provider's indicated prices. The final price of the threshold value is calculated from the ordered list of service providers. The gateway selects the service provider having minimum price including both printing and shipping prices, and then adds a pre-established percentage over that price, which is stored in the gateway database 109, for example a five percent mark up, and that is the threshold used to discard a service provider from the list. That is, the threshold price is the price of the service provider with minimum cost and percentage over that price. If the price of the print service provider is found to be below (or within) the final price threshold value pre-determined by the business entity running gateway device 108 then control is passed to step 706, wherein a question is asked as to whether any further service providers remain in the list for processing. If the answer to the question asked at step 706 is answered in the affirmative then control is returned to step 702 and the next service provider in the list is selected for further processing in steps 702 onwards. However, if the question asked at step 704 is answered in the negative then gateway control apparatus 108 is effectively configured to discard the service provider presently being interrogated because its cost is too high for a given customers requirements. Discarding of the service provider occurs at step 705 whereafter control is passed to step 706 and again the question is asked as to whether there are any further service providers to process. If the answer to the question asked as step 706 is in the affirmative then control is passed to step 702 and the steps are repeated for the next selected service provider in the list. Upon reaching step 706 gateway apparatus 108 is configured to pass control to step 707, if the question asked at step 706 is answered in the negative. At step 707 yet further processing is invoked by gateway device 108 which includes processing the revised list now so obtained and effecting a selection of a given service provider. Following selection of a final service provider deemed to be most appropriate for undertaking the work required by a given customer control is passed to step 708 wherein process 502 for the given current customer enquiry/order is effectively terminated with control being passed thereafter to step 503 in FIG. 5. It should be noted that at step 704 in FIG. 7 if a given print service provider is determined to be able to ship a given printing job at a price within the pre-determined final threshold price then it is effectively treated as having an equal status to any other print service providers which are also able to undertake the required work and able to ship or deliver the completed product within the required final price threshold. Thus, at this stage there is still not a finalized selection of the final print service provider which will effectively be requested to undertake the required work by gateway device 108—in other words the finally selected print service provider will not necessarily be the one which offers the lowest price. This is highly preferable because if a given print service provider is always given a job (based on lowest price) then this would be detrimental to the other print service providers operating under the gateway service provider 108.

Figure 8:
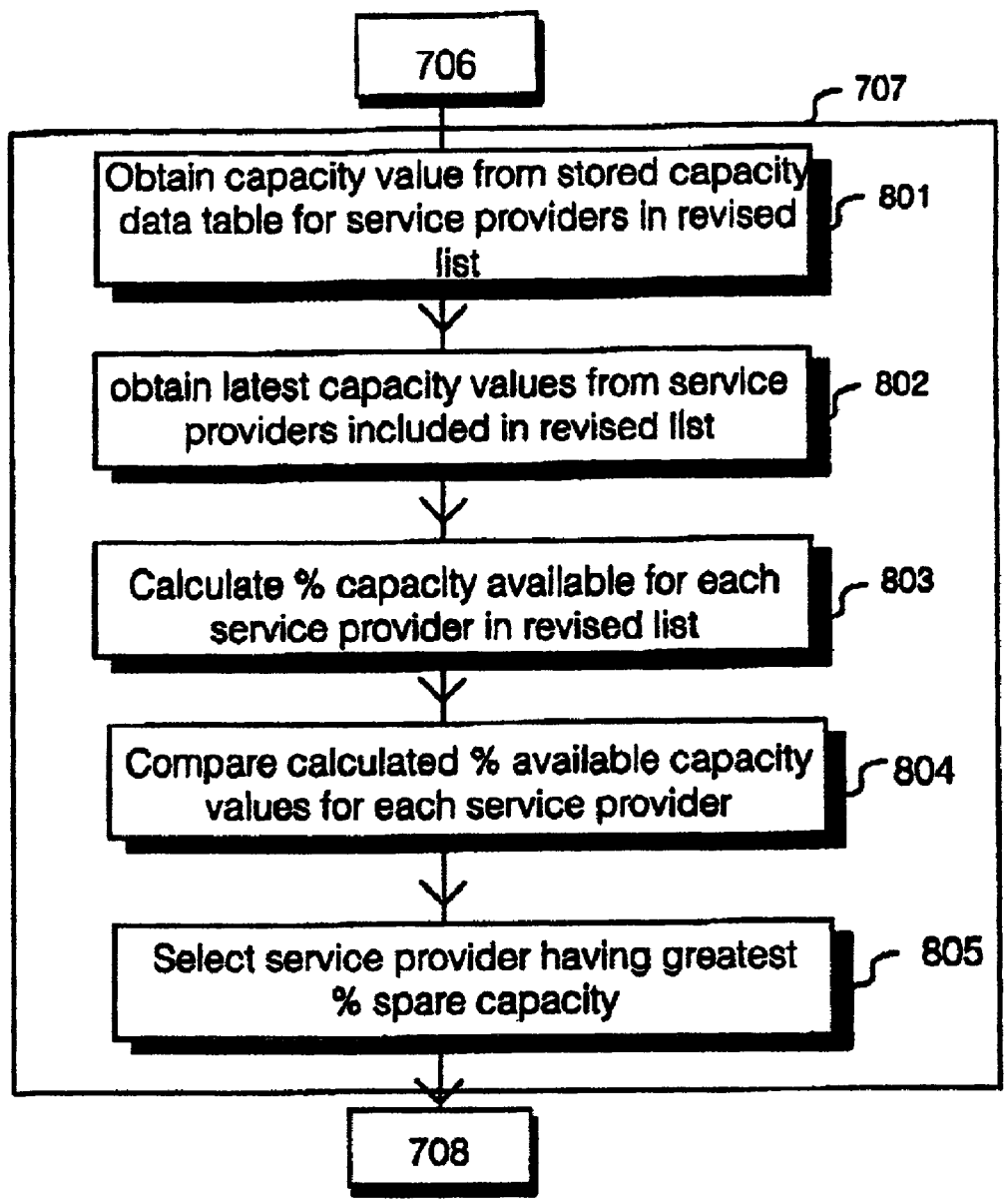
FIG. 8 further details step 707 identified in FIG. 7 and includes a step of calculating the percentage capacity available for a given service provider in the revised list of remaining service providers having the required attributes for a job currently being processed.

Step 707 in FIG. 7 relating to processing the revised print service provider list and selecting a finalized service provider is further detailed in FIG. 8. Following step 706 processing control in gateway device 108 is passed to step 801 wherein the gateway device 108 is configured to obtain capacity values from a stored daily capacity data table for service providers in the revised list.

FIG. 9 schematically illustrates a table of a type suitable for storage by gateway device 108. The table illustrated in FIG. 9 comprises information relating to each given service provider in the revised list, each service provider being identified in an identifier in column 901. Column 902 comprises a daily print capacity data of each given service provider. Column 3 comprises data relating to the current load (that is the amount of work) that a given service provider is currently assigned by the print merchant gateway. Column 4 comprises calculated free capacity values being a % of the contracted daily capacity to which the print merchant has assigned orders, for each service provider remaining in the list. Thus, service provider #1, in row 905 has a contracted daily capacity of 100, a current workload of 20 jobs and therefore a free contracted daily capacity percentage of 80%. Similarly, service provider #2 in row 906 is indicated as having a capacity of 200 jobs for a given day and a current workload of 20 jobs in column 903 and therefore a current percentage free capacity of 90%. Row 907 holds data for service provider #3 which is indicated as having an available contracted daily capacity of 50, a current workload of 10 and therefore a percentage free capacity for that day of 80%. Thus, at step 801 gateway device 108 interrogates a table of the type as illustrated in FIG. 9 (stored electronically in database 109) so as to obtain capacity values and current workload values and thereafter to calculate percentage free capacity values of the type identified in column 904 of FIG. 9. The percentage free capacity parameter (column 4) calculated for each given service provider is required for use in selecting a final service provider for a given customers requirements taking into account geographical location, printing cost quoted by the PSP, shipping cost and the free capacity parameter so as to ensure that all print service providers receive work. Following step 801 in FIG. 8 processing control in gateway device 108 is passed to step 802 wherein gateway device 108 is required to obtain the latest capacity values from the service providers which remain included in the revised list of suitable/available service. In other words gateway device 108 is required to obtain the capacity of the service provider from column 902 and also to obtain a current up-to-date workload value as identified in column 903 of FIG. 9. Following determination of the capacity and current workload of a given service provider control is passed to step 803 wherein gateway device 108 is configured to calculate the percentage free capacity which is available for each service provider in the revised list this data being stored, in the preferred embodiment, in column 904 of the electronic table schematically illustrated in FIG. 9. Following step 803 gateway device 108 is configured to compare the calculated percentage available capacity of a given service provider with the same parameter calculated for the other remaining service providers in the list. Following step 804 gateway device 108 may be configured to select the service provider having the greatest percentage spare capacity. The service provider having the greatest percentage spare capacity is thus the final selected service provider deemed most appropriate to undertake the work ordered or queried as to cost by the customer 113. In another mode of operation, the service providers are selected in rotation, with the object that each print service provider is sent orders so that the percentage utilization for each print service provider is maintained approximately equal, and no print service provider is starved of orders. Following step 805 control is returned to step 708 in FIG. 7 wherein process 502 for the current given customer enquiry/order is effectively terminated. It should be noted that the value indicated in the table identified in FIG. 9 are given for illustrative purposes only. Typically the figures may relate to capacity as defined as the number of jobs that a print service provider can print in a day, but this may equally be implemented as the number of jobs that a print service provider can undertake in another period of time such as a week.

Instead of daily capacity, the contracts may specify monthly or weekly capacity as an alternative. The capacity period used in the print service provider processing algorithms of concern in the present invention will be, to some extent dependent upon a given gateway 108 owners requirements.

It will be understood by those skilled in the art that various other processing steps may be required to implement the present invention, but that these are of a general nature known to those skilled in the art. The important steps involved in the data processing implemented in gateway device 108 have been disclosed in terms of the best mode known to the inventors.

Figure 10:
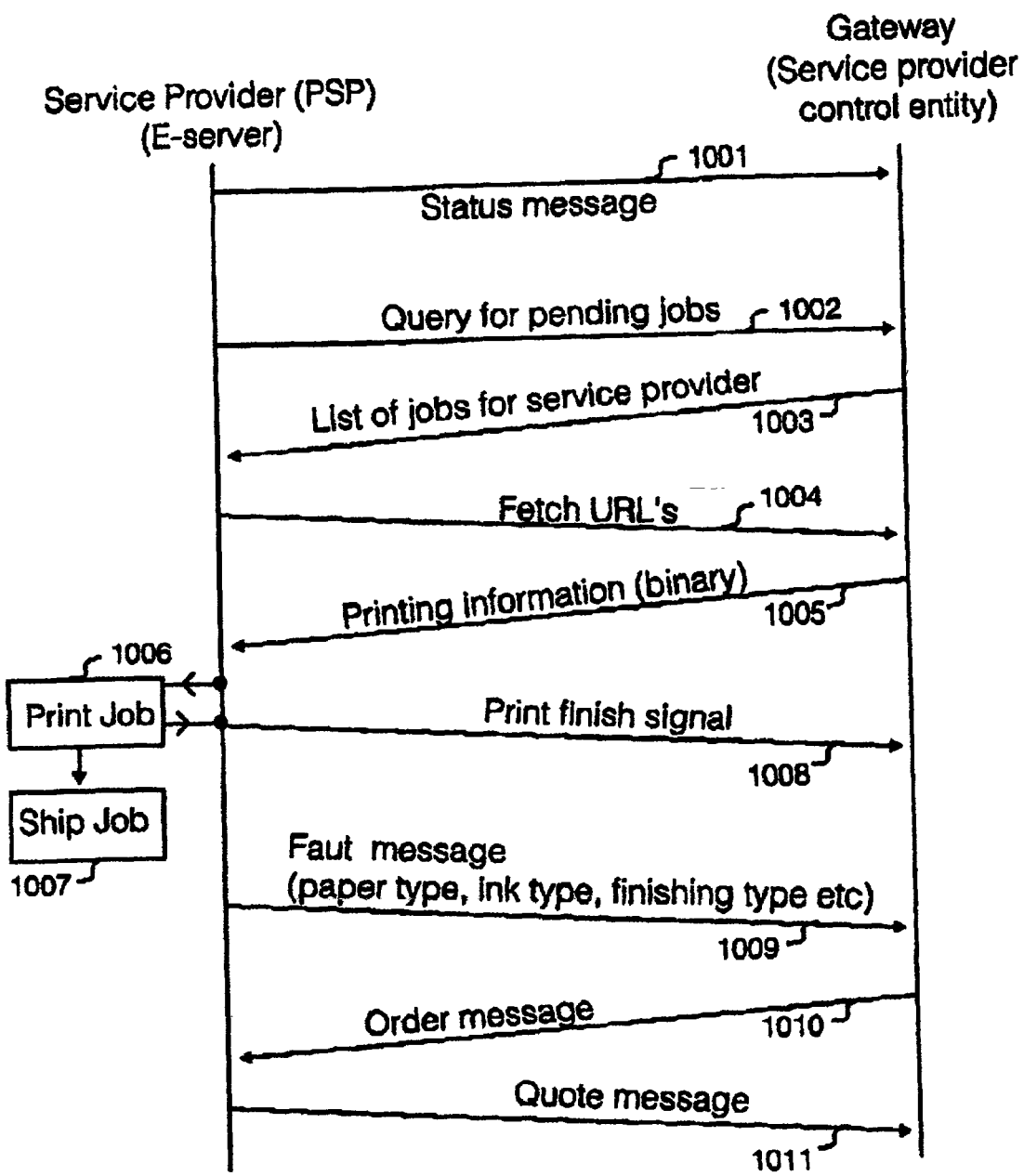
FIG. 10 schematically illustrates an overview of various messages transmitted between a print service provider e-server 102 and gateway device 108 of FIG. 1.

To implement the processing steps identified in the aforementioned figures various types of messages and signals are required to be sent between a service provider and gateway host 108 and an overview of these is given in FIG. 10 as follows. Thus, in order for a print service provider (PSP) to interact with gateway device 108 a status message sent from the service provider to the gateway device is required as indicated at 1001. Similarly, it is preferable for the service provider to be able to query the gateway device 108 as to whether or not there are any pending jobs waiting for it and thus a query message 1002 may be implemented so as to ensure effective processing at all times. Following a query for pending jobs of the type identified at 1002, gateway device 108 may be configured to forward a complete list of jobs for the service provider by way of a message comprising the required information as identified at 1003. Following receipt of a message of the type 1003 a service provider in receipt of such a message may then request the job ticket for a specific job with all the information needed to print the job by way of a message as indicated at 1004. Gateway device 108, following receipt of such a fetch message 1004, is then suitably configured to transmit a printing information message in binary to the service provider requesting the fetch, this being indicated by message 1005. Following receipt of a printing information message 1005 by a given service provider the service provider may then action printing of a given print job received as indicated at 1006 in FIG. 10. Following printing of the job the service provider may then arrange for the job to be shipped out to the customer as indicated at 1007. Additionally, following printing, the service provider may then issue a print finish signal 1008 to gateway device 108 so as to confirm that a given print job has been completed and shipped.

Other messages may be required these including the service provider issuing a fault message 1009 if for example it does not have the required paper type, ink type or finishing type etc at the time of a request for printing services being made.

This fault message is a special message which can be generated at any time during processing of a customer order. A fault message is required for unforeseen events such as for example a print service provider running out of paper or another essential consumable item required for completion of a job.

The price information required for successful and effective data processing as identified in step 603 of FIG. 6 may be configured in a variety of ways. In the preferred embodiment price is stored in a table and maintained automatically by each PSP E-server. This preferred implementation effects messaging to gateway device 108 about any changes in prices quoted by print service providers. Alternatively, however, the price information associated with each PSP E-server may be held in a single table in database 109 of gateway device 108 and this table may be maintained either manually or automatically by messaging from each given PSP E-server As discussed previously gateway device 108 is configured to transmit an order message to a selected service provider by way of a message such as message 1010 and similarly a given service provider selected as being the most appropriate service provider for a job is required to send a quote message 1011 to gateway device 108 upon it having received an order message.

Figure 11:
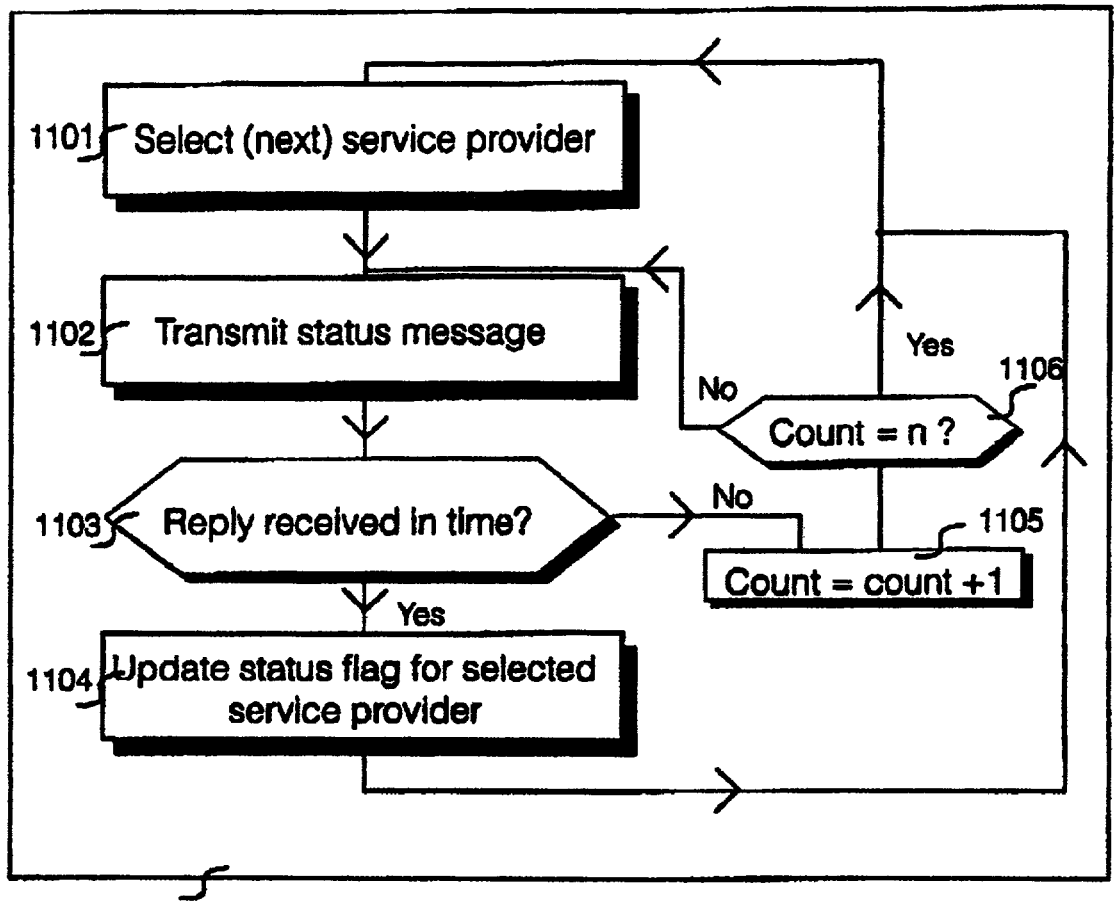
FIG. 11 schematically illustrates a process 305 for checking the status of a given service provider.

In order to run the gateway device effectively the gateway device is required to transmit a status message to each print service provider intermittently so that it is more or less constantly up to date with whether or not a print service provider is or is not available/able to deal with a certain type of print job. FIG. 11 illustrates such a process which is to be considered further detail associated with process 305 identified in FIG. 3. At step 1101 gateway device 108 is configured to select the next service provider in a list of all service providers held in its database 109. Following step 1101 control is passed to step 1102 wherein gateway device 108 is configured to transmit a status message as discussed above. Following step 1102 gateway device 1103 is required to check intermittently as to whether or not a reply has been received in time from a selected print service provider. If a reply is received in time the question asked at step 1103 is answered in the affirmative and a status flag for the selected print service provider may be set as identified at step 1104. Following step 1104 control is returned to step 1101 wherein the next service provider in the complete list of service providers is selected for an update as to its current status. However, if the question asked at step 1103 is answered in the negative, to the effect that a print service provider has not replied to a status message signal then a count may be incremented as indicated at step 1105 with control thereafter being passed to step 1106 where a question is asked as to whether the count has reached a predetermined value "N". If the question asked at step 1106 is answered in the affirmative then control is passed to step 1101 and the currently selected print service provider is assumed to be effectively switched off and so control is passed to interrogating the next print service provider in the overall print service provider list. However, if the question asked at step 1106 is answered in the negative then effectively a time out has not occurred and the service provider selected at step 1101 is effectively given a further chance to reply since control is returned to step 1102 with subsequent transmission of a further status message. In this way the current status of a given print service provider is more reliably known with the result that the overall processing by gateway device 108 is more reliably implemented.

Further alternative embodiments are possible and processing described for gateway device 108 may be considered to represent a series of filters in that it is designed to optimize selection of a given print service provider from a plurality of competing print service providers. In an alternative embodiment to that described it may be preferable to implement step 605 in FIG. 6 by way of assignment of given order to a fictitious print service provider. If there is one print service provider determined to be suitable, as indicated at step 701 in FIG. 7, then if it has reached its print capacity this may also be assigned to a fictitious PSP. Where a print order is assigned to a fictitious print service provider, because a print service provider capable of doing the job and within a competitive price is not available, then there are two alternatives. Firstly, a human can intervene at the gateway, to select a print service provider best able to do the job, overriding the selection algorithm. Secondly, the selection algorhythm can wait until a print service provider capable of fulfilling the print order becomes available, at which point the print order is assigned to that real print service provider.

Implementing the data processing steps identified in the accompanying drawings may be achieved in a variety of ways depending upon a given gateway posts requirements. If the selected PSP has reached its print capacity for example, then it may be appropriate to assign the given customer order to a fictitious PSP since thereafter the job may be assigned to an alternative PSP that can handle the order or the job may be assigned to the same PSP if it can print more than its stated capacity.

Clearly from the aforementioned description if there is just one PSP and the PSP has not reached its print capacity then the selection is automatically achieved. If there are a plurality of PSP's selected as identified after step 701 at 702 then in effect a more intelligent filter is applied—this filter will try to get low prices for the customer with some trade-offs to avoid PSP's with more expensive prices to be starved of orders. As described this is achieved through use of a single system parameter which effectively represents a final price threshold (in a given currency) from zero to infinity. The selection in effect is based on the lowest overall price and the system will find this number comparing, for the different PSP's, their price for supply of a print order to the country specified in the shipping address of the order supplied by a given customer. However, if the difference with other PSP's is lower than the final price threshold shipping price then an additional criteria is used. Among the PSP's that do not differ from the cheapest, on more than the final price threshold value, then the PSP that is lowest (in percent) from its contracted print capacity is effectively selected.

In the preferred embodiment, every time there is a new job requested by a given customer, the gateway 108 is configured to ask the E-server for a quote and the E-server works out the quote from its own data table. This is the reason for implementation of the order message 1010 in FIG. 10 and the returning quote message 1011. Quote message 1011 includes a price figure (eg. in British pounds or U.S. dollars) and this money figure may be broken down into different components for the work to be undertaken or may just be a single number. In the preferred embodiment the E-server being queried as to a quote preferably returns to the gateway device a money figure which includes a break down of the overall price of the job to be undertaken. Thus, the returned quote figure may include information as to the price of creating the prints, the price for the shipping etc which thereby enables the gateway device 108 to pass onto the customer how much each portion of a given job will cost.

The present invention as described has many advantages over prior art approaches in that it enables greater exploitation (resulting in higher efficiency) of the capabilities of a world wide printing warehouse and thus is suitable for implementation by large organizations having distribution centres scattered in a wide variety of places around the world.

One final point that is to be understood by those skilled in the art is that the version described as the preferred embodiment involves the print service provider being responsible for the shipping. However, this is not to be considered as restrictive in that it is possible in other envisaged embodiments that the gateway may be responsible for allocating a cost to shipping and organizing the delivery of given printed goods.

Finally, the skilled worker should also appreciate that a first order supplied to gateway device 108 may be routed to a first print service provider and the next order is not necessarily to be routed to the same PSP—it may get routed to a different PSP by virtue of the processing steps as previously detailed.

The invention claimed is:

1. An electronic control apparatus configured for use in routing customer orders received over an electronic network to a service provider selectable from a plurality of service providers, said apparatus comprising: an electronic interface configured to receive and acknowledge said customer orders;
   first processing means configured to compare the requirements of a said received customer order with pre-stored information specific to each of said plurality of service providers;
   a memory configured to store a list of said service providers determined to be able to fulfill the requirements of a said received order; and
   further processing means configurable, for a received order, to make a said selection of at least one service provider from said list, and to route said received order to said selected service provider,
   wherein the further processing means is configurable to make the said selection comprising:
       determining a final threshold price based on one or more indicated prices of one or more of the said service providers in the list and a pre-established mark-up;
   discarding from the list the said service providers in the list having a said indicated price above that of the final threshold price; and
   comparing printing-capacity utilization values of the said service providers remaining in the list by calculating an unutilized percentage of a contracted capacity of each of said service providers remaining in the list to determine which of the said service providers remaining in the list has a highest capacity.

2. An electronic control apparatus as claimed in claim 1, wherein said first processing means is configured to identify and discard service providers which do not support a particular service requested in a said customer order.

3. An electronic control apparatus as claimed in claim 1, wherein said first processing means is configured to identify, via transmissions of a status signal, if a said service provider is currently in operation or unavailable.

4. An electronic control apparatus as claimed in claim 3, wherein said status signal is transmitted periodically.

5. An electronic control apparatus as claimed in claim 1, wherein said further processing means comprises list sorting means configured to sort said list of service providers according to a cost parameter associated with delivery of a product from a said service provider, to a said customer.

6. An electronic control apparatus as claimed in claim 1, configured to receive price parameter values associated with delivery of a product resulting from a said received customer order to a said customer, said received values being provided by individual ones of said plurality of listed service providers.

7. An electronic control apparatus as claimed in claim 1, wherein if no service provider is selected, then a signal is transmitted to alert an operator of said apparatus that a said order being processed must be routed by manual intervention of the operator.

8. An electronic control apparatus as claimed in claim 1, operating to allocate an order to a fictitious service provider, if said list contains no service providers.

9. An electronic control apparatus as claimed in claim 1, wherein said farther processing means is configured to read delivery price information associated with a said order, said information being accessible by said apparatus from a database or other suitable data storage medium.

10. An electronic control apparatus as claimed in claim 1, configured to receive a query message for pending jobs from a service provider.

11. An electronic control apparatus as claimed in claim 1, configured to transmit a message to a service provider, said message comprising a list of jobs available for the service provider to complete.

12. An electronic control apparatus as claimed in claim 1, configured to receive a job completion signal from a service provider upon completion of an allocated job.

13. An electronic control apparatus as claimed in claim 1, configured to transmit an order message to a service provider.

14. An electronic control apparatus as claimed in claim 1, configured to receive a quote message from a service provider upon a request for costs associated with a given service to be completed being requested.

15. An electronic control apparatus as claimed in claim 1, configured to store data comprising a list of service providers, a list of service provider contracts, and data in respect of the printing capabilities of said service providers.

16. A method of automatically selecting a service provider from a plurality of service providers operating to complete customer orders received over an electronic network said method comprising the steps of:
   comparing the requirements of a received order with pre-stored information specific to each of said service providers and in response to said comparison establishing a list of said service providers able to fulfill the requirements of said received order; and
   making selection of at least one said service provider from said list; and
   routing said received order to said selected service provider,
   wherein the step of making selection comprises:
   determining a final threshold price based on one or more indicated prices of one or more of the said service providers in the list and a pre-established mark-up;
   discarding from the list the said service providers in the list having a said indicated price above that of the final threshold price; and
   comparing printing-capacity utilization values of the said service providers remaining in the list by calculating an unutilized percentage of a contracted capacity of each of said service providers remaining in the list to determine which of the said service providers remaining in the list has a highest printing capacity.

17. The method as claimed in claim 16, further comprising the step of:
identifying and discarding service providers which do not support a particular service requested in a said customer order.

18. The method as claimed in claim 16, comprising the step of:
identifying via transmissions of a status signal, if a said service provider is currently in operation or unavailable.

19. The method as claimed in claim 16, wherein said step of determining the final threshold price is farther based on one or more pre-agreed delivery price data of the one or more said service providers in the list.

20. The method as chimed in claim 19, further comprising:
storing the pre-agreed delivery price data.

21. The method as claimed in claim 16, comprising:
receiving a query message for pending jobs from a said service provider.

22. The method as claimed in claim 16, comprising:
storing data comprising a list of service providers, said data comprising:
a plurality of contracts governing a business relationship with a said service provider;
a set of capability data describing capabilities of said service providers.

23. The method as claimed in claim 22, wherein said capability data comprises a list of web site association data.

24. A method of allocation of online print services, supplied by a plurality of print service provider entities said method comprising the steps of:
storing data describing a plurality of print service provider entities;
automatically selecting a print service provider for fulfillment of an order received online; and
sending said order to said print service provider for fulfillment by said selected service provider,
wherein the step of automatically selecting comprises:
determining a final threshold price based on one or more indicated prices of one or more of the plurality of print service provider entities and a pre-established mark-up; and
selecting the said print service provider that has a said indicated price within the final threshold price and a lowest printing-capacity utilization value of the said print service providers that have a said indicated price within the final threshold price, the lowest printing-capacity utilization value determined based on a percentage utilization of a contracted capacity of each of said print service providers that have a said indicated price within the final threshold price wherein the said lowest printing-printing capacity utilization value is a highest-percentage-free printing capacity.

25. A method of allocation of online print services, supplied by a plurality of print service provider entities said method comprising the steps of:
determining a final threshold price for a print order received over an electronic network based on a pre-established mark-up and one or more prices for the print order from service providers that are able to fulfill the print order and based on stored data describing the service providers;
selecting from the service providers that are able to fulfill the print order a service provider:
having a price within the threshold price;
a highest free printing capacity, the highest free printing capacity determined by calculating an unutilized percentage of a contracted capacity of each of said service providers that are able to fulfill the print order and have a price within the threshold price, and
enabling fulfillment of the print order by the selected service provider by sending the print order to the selected service provider or by indicating that the selected service provider is selected to fulfill the print order.

26. The method of claim 25, further comprising:
comparing requirements of the print order with information specific to each of the service providers effective to determine which of the service providers are able to fulfill the requirements.

27. The method of claim 25, further comprising determining the highest free printing capacity using a contracted daily printing capacity and a current printing workload for each of the service providers that are able to fulfill the print order.

28. The method of claim 25, wherein the ac of determining the final threshold price comprises adding the pre-established mark-up to a lowest process for the print order from the service providers that are able to fulfill the print orders.

29. The method of claim 25, further comprising sending the print order to the selected service provider for fulfillment by the selected service provider.

30. The method of claim 25, wherein each of the one or more prices for the print order from the service providers that are able to fulfill the print order comprises: a printing cost quoted by one of the service providers; and a shipping cost to ship the fulfilled print order from that service provider to a location associated with the print order.

31. The method as claimed in claim 16, wherein the act of comparing printing-capacity utilization values comprises determining printing-capacity utilization values for each of the said service providers remaining in the list.

32. The method as claimed in claim 16, wherein calculating an unutilized percentage of a contracted capacity comprises calculating a percentage of a printing capacity not utilized by a current workload for each of the said service providers remaining in the list.

* * * * *